United States Patent

[11] 3,537,500

[72] Inventor Heinz Wilhelm Beneze
  Akron, Ohio
[21] Appl. No. 805,154
[22] Filed March 7, 1969
[45] Patented Nov. 3, 1970
[73] Assignee The Firestone Tire & Rubber Company
  Akron, Ohio
  a corporation of Ohio

[54] TIRE CONSTRUCTION
  10 Claims, 8 Drawing Figs.
[52] U.S. Cl. ................................................ 152/211,
  152/169
[51] Int. Cl. .................................................. B60c 11/08
[50] Field of Search .......................................... 152/209,
  361, 169, 211

[56] References Cited
UNITED STATES PATENTS
1,063,221 6/1913 Seipp ........................... 152/211
1,215,216 2/1917 Swartz .......................... 152/211
1,487,623 3/1924 Thompson .................... 152/169

Primary Examiner—Arthur L. La Point
Assistant Examiner—George H. Libman
Attorneys—S. M. Clark and Gordon B. Seward ABSTRACT: A vehicle tire wherein the carcass including the sidewalls is constructed of a first elastomeric material such as polyurethane and the tread is constructed of a second elastomeric material such as a natural or synthetic rubber tread stock with a continuous ring of substantially inextensible material imbedded in the tread material. The outer portion of the tread material adjacent the road engaging surface is provided with a pluraltiy of circumferentially spaced and generally axially extending grooves or passages which are filled with the first elastomeric material as an extension from one sidewall to the other to mechanically interlock the tread to the carcass.

Patented Nov. 3, 1970 3,537,500

TIRE CONSTRUCTION

An object of the invention is to provide a tire construction wherein the carcass is constructed of a first elastomeric material and the tread is constructed of a second elastomeric material thereby positioning the desired material of construction at the proper location.

Another object of the present invention is to provide a tire construction wherein a first elastomeric material of the carcass extends through openings or passages in a second elastomeric material of the tread in a one piece or integral manner so as to mechanically interlock the tread to the carcass.

Another object of the present invention is to provide a tire construction wherein a unique means is provided of mechanically interlocking the tread which includes natural or synthetic tread stock material within which is located a substantially inextensible annular member, to the carcass which is preferably constructed of a polyurethane or similar material.

Other objects and a fuller uderstanding of this invention may be had by referring to the following description and claims, taken in conjunction with the accompanying drawings in which:

Figure 1:
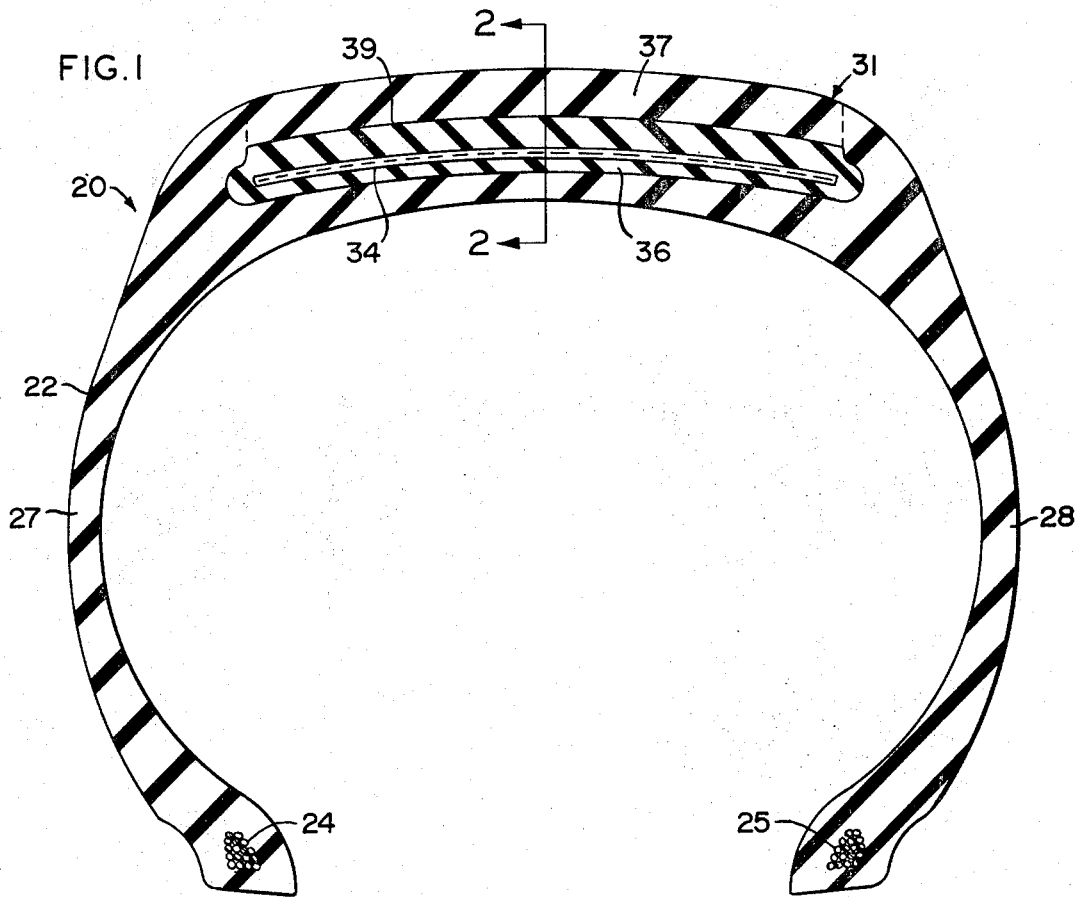
FIG. 1 is a cross-sectional view of a tire constructed under the teachings of the present invention.
Figure 3:
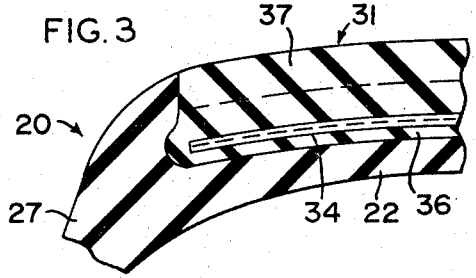
FIG. 3 is a view taken generally along the line 3-3 of FIG. 2.
Figure 2:
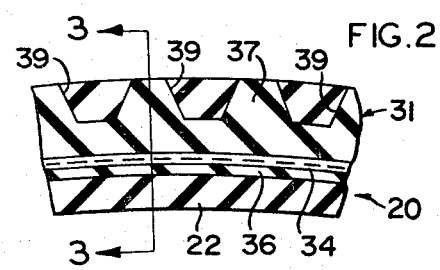
FIG. 2 is a view taken generally along the line 2-2 of FIG. 1.

The tire of the present invention is best seen and understood by referring specifically to FIGS. 1 through 4, in view of the following discussion. The tire in these FIGS. has been indicated generally by the reference numeral 20 and it includes in combination a carcass 22 which has beads 24 and 25 connected to sidewalls 27 and 28 which sidewalls merge into what has been referred to as a tread portion 31. The sidewalls are formed of a first elastomeric material such as polyurethane which material has many highly desirable qualities for use in vehicle tires, however, it does not have the best abrasion resistance which is a desirable quality for that portion of the tire which engages the road surface. The carcass 22, as in the normal tire construction, extends continuously and circumferentially to form a generally ringlike shape. The tread portion 31 which has been hereinabove referred to, also extends in a continuous and circumferentially extending manner and this tread portion comprises a continuous ring of substantially inextensible material 34 which is imbedded in a continuous ring of a second elastomeric material. The second elastomeric material defines inner and outer ring portions 36 and 37, respectively, on either side of the inextensible material 34. The second elastomeric material is comprised of a suitable natural or synthetic rubber tire tread stock which materials are well known to those skilled in the art. The inextensible material may be a natural or synthetic cord or fabric impregnated with the second elastomeric material or metal cord or fabric as well as a fiberglass cord or fabric impregnated with the second elastomeric material. The continuous and circumferentially extending nature of the tread portion 31 is shown separate from the finally completed tire in FIG. 4 and this view, as well as FIGS. 1 through 3, shows a plurality of circumferentially spaced grooves 39 which extend completely across and generally in the width direction of the tread portion 31. It will be seen from FIGS. 2 and 4 that the grooves or passages 39 are wider at the top than at the bottom.

Figure 4:
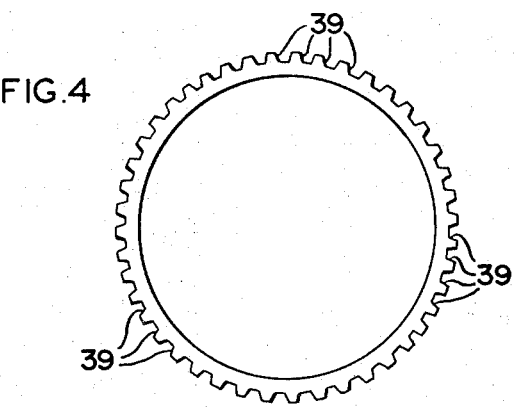
FIG. 4 is an elevational view showing the annular ring of tread material before its incorporation into the tire.

The tire is constructed by separately producing the tread portion 31 in any suitable manner to provide a construction and configuration as shown in FIG. 4. A mold is then utilized which has an inner surface which conforms to the outer shape of the tire shown in FIG. 1 and which has an inner core with an outer surface which produces the inner configuration of the tire shown in FIG.1. The tread portion shown in FIG. 4 is then placed in this mold with the outer peripheral surface of the tread portion 31 engaging the inner surface of the mold. The material of construction of the carcass is then poured into the mold and the shape of the tire is thus formed and it will be observed that this material of construction such as polyurethane will flow through the grooves or the passages 39 so as to produce a plurality of extensions of polyurethane material from the sidewall 27 to the sidewall 28 so as to mechanically interlock the tread portion 31 to the carcass 22 of the tire.

The inextensible material 34 of the tread portion has the additional quality of tending to restrict the growth of the polyurethane from which the carcass is constructed. It will be appreciated, therefore, that the material of the outer ring portion 37 which is adapted to engage the road surface, provides the desired abrasion resistance needed in the vehicle tire and the material of construction of the carcass which extends through and fills the grooves 39 provides the necessary mechanical interlocking to keep the tread portion securely attached to the carcass.

Figure 5:
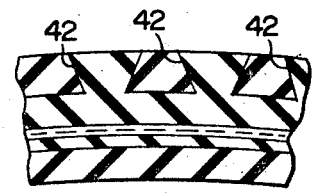
FIG. 5 is a view similar to FIG. 2 but showing a modification in the shape of the tread material.

With this particular method of construction which has been shown and described hereinabove, it is possible to vary as desired the amount of the specific material of the tread portion which is to form the road-engaging surface of the vehicle tire. FIG. 5 demonstrates grooves 42 of a different configuration wherein the grooves are wider at their bottom than they are at their top which is at the road-engaging surface. It will be appreciated that this reduces the amount of polyurethane which is to form the road-engaging surface and increases the road-engaging surface material which is of the desired tread stock. This construction also changes the mechanical interlocking strength by which the tread portion is secured to the carcass.

Figure 6:
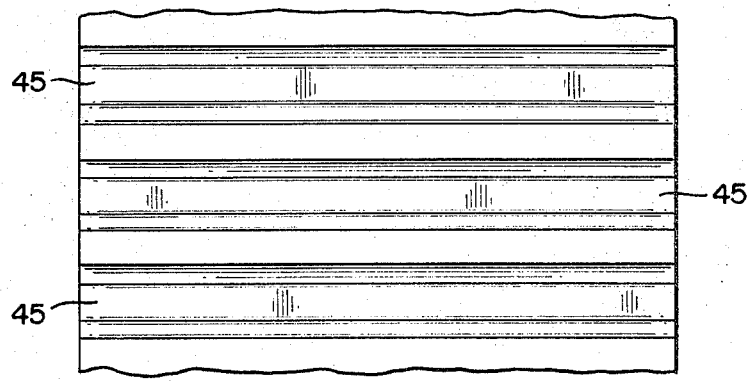
FIG. 6 is a fragmentary plan view of one form of the tread material.

FIG. 6 demonstrates that grooves 45 in the outer ring portion of the tread may extend in the precise width direction of the tire or in other words in a manner which is parallel to the axis of the tire.

Figure 7:
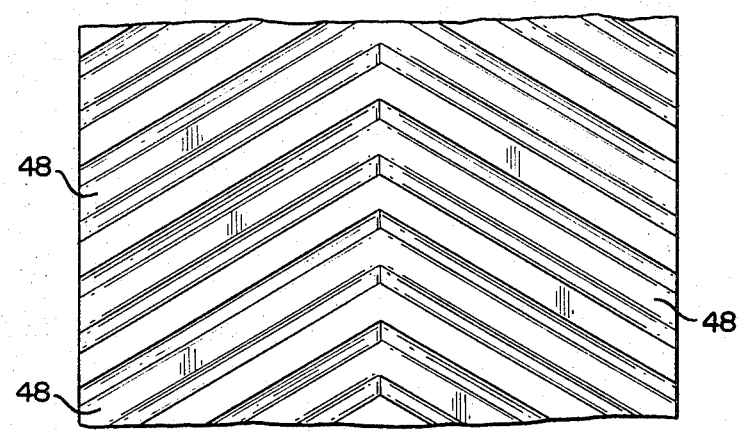
FIG. 7 is a fragmentary plan view of another form of the tread material.
Figure 8:
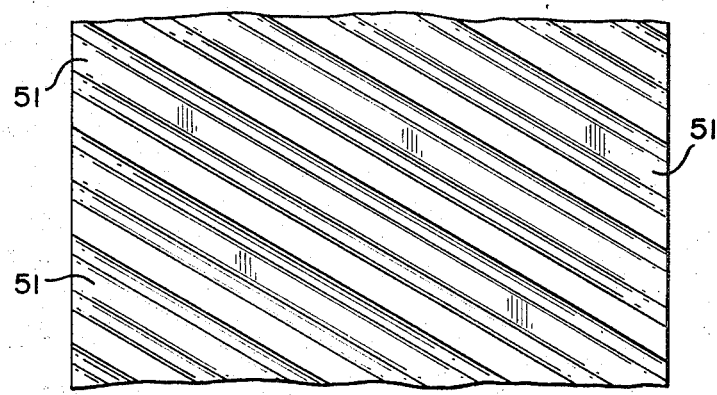
FIG. 8 is a fragmentary plan view of still another form of the tread material.

FIG. 7 demonstrates another variation in the direction that grooves 48 in the tread portion might extend and it will be seen here that the grooves 48 extend at an acute angle to the axis of the tire to the center line of the tire and at the same acute angle from the center line to the other side of the tire but in an opposite direction. FIG. 8 shows grooves 51 extending at an acute angle to the axis of the tire and at the same acute angle the entire width of the tire.

It will be apparent to those skilled in the art that any tread pattern of grooves, bars, lugs, ridges, etc., are possible under the teachings of the present invention as well as a smooth pattern if it might be desired. In addition to the abrasion resistance imparted by the tread stock 37, it will also be appreciated that this material adds to the skid resistance. There is an appreciable amount of shrinkage in the polyurethane after curing and this assists to a large extent in the mechanical gripping of the tread portion.

It will therefore be apparent from a review of the above disclosure that a vehicle tire construction has been disclosed wherein the tread of the tire is extremely well mechanically connected to the carcass of the tire. This gives rise to the decided advantage that a compromise need not be made in the material of construction of the different portions of the tire. In this particular tire which has been described wherein the carcass is constructed of polyurethane, the polyurethane tire has been provided with the desired abrasion resistance in the tread by constructing the tread of a natural or synthetic tread stock and mechanically attaching the same to the polyurethane carcass. With this particular method of construction it is possible to vary the mechanical interlocking qualities within a wide range and to vary the amount of tread stock surface which engages the road as compared to the material which forms the mechanical interlocking and which is the material of construction of the carcass.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. A tire including in combination a carcass having beads connected to sidewalls which merge into a tread portion, said sidewalls being formed of a first elastomeric material, said carcass extending continuously and circumferentially to form a generally ringlike shape, said tread portion comprising a continuous ring of substantially inextensible material embedded in a continuous ring of a second elastomeric material with said second elastomeric material defining inner and outer ring portions on either side of said inextensible material, said outer ring portion of said continuous ring of second elastomeric material having wall means defining a plurality of circumferentially spaced grooves which extend completely across and generally in the width direction of said tread portion, said first elastomeric material of said sidewalls extending from either sidewall and through said grooves in an integral manner to mechanically interlock said tread portion to said carcass of the tire.

2. A tire as claimed in claim 1, wherein said first elastomeric material comprises a polyurethane.

3. A tire as claimed in claim 2, wherein said second elastomeric material comprises a tire tread stock.

4. A tire as claimed in claim 1, wherein said grooves extend substantially in an axial direction with respect to the axis of the tire.

5. A tire as claimed in claim 1, wherein said ring of substantially inextensible material is constructed of fiberglass cord impregnated with an elastomer.

6. A tire as claimed in claim 1, wherein said ring of substantially inextensible material is constructed of synthetic cord impregnated with an elastomer.

7. A tire as claimed in claim 1, wherein said grooves extend substantially at an acute angle with respect to the axis of the tire.

8. A tire as claimed in claim 1, wherein the grooves are narrower at their bottom then at their top.

9. A tire as claimed in claim 1, wherein the grooves are wider at their bottom then at their top.

10. A tire as claimed in claim 1, wherein said ring of substantially inextensible material is constructed of metal cord impregnated with an elastomer.